United States Patent
Eng et al.

(10) Patent No.: US 11,594,122 B2
(45) Date of Patent: *Feb. 28, 2023

(54) DEVICE-BASED NOTIFICATION GENERATION

(71) Applicant: Comcast Cable Communications, LLC, Philadelphia, PA (US)

(72) Inventors: Adam Eng, Centennial, CO (US); Tyler Vitale, Eureka, MO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 7 days.

This patent is subject to a terminal disclaimer.

(21) Appl. No.: 17/381,970

(22) Filed: Jul. 21, 2021

(65) Prior Publication Data

US 2022/0005343 A1 Jan. 6, 2022

Related U.S. Application Data

(63) Continuation of application No. 16/141,551, filed on Sep. 25, 2018, now Pat. No. 11,100,787.

(51) Int. Cl.
G08B 25/10 (2006.01)
G08B 21/18 (2006.01)

(52) U.S. Cl.
CPC ............ *G08B 25/10* (2013.01); *G08B 21/18* (2013.01)

(58) Field of Classification Search
CPC ...... G08B 25/10; G08B 21/18; H04L 41/0853
See application file for complete search history.

(56) References Cited

U.S. PATENT DOCUMENTS

| | | | |
|---|---|---|---|
| 10,531,266 B2 * | 1/2020 | Rauner | G08B 27/001 |
| 11,100,787 B2 * | 8/2021 | Eng | G08B 21/18 |
| 2006/0195590 A1 | 8/2006 | Tsubota | |
| 2007/0069004 A1 | 3/2007 | Adler | |
| 2009/0144104 A1 | 6/2009 | Johnson | |
| 2012/0210000 A1 | 8/2012 | Wood | |
| 2013/0080251 A1 | 3/2013 | Dempski | |
| 2015/0269613 A1 | 9/2015 | Fernandez-Ruiz | |
| 2016/0105814 A1 | 4/2016 | Hurst et al. | |
| 2017/0032332 A1 | 2/2017 | Bell | |
| 2018/0052988 A1 | 2/2018 | Ariyoshi et al. | |

* cited by examiner

*Primary Examiner* — John A Tweel, Jr.
(74) *Attorney, Agent, or Firm* — Banner & Witcoff, Ltd.

(57) ABSTRACT

Systems, apparatuses, and methods are described for determining a notification based on device properties. A device identification database may associate device identifications with device properties. A device identification associated with a device may be received, and corresponding device properties may be determined. Based on the device properties, a notification may be determined and sent.

20 Claims, 6 Drawing Sheets

| ID 1 (MAC Address) | ... | ID n (CEC) | Prop. 1 (Device Type) | Prop. 2 (Mfr. Year) | ... | Prop n (Recall) |
|---|---|---|---|---|---|---|
| MAC Address 1 | ... | CEC ID 1 | Smartphone | 2013 | ... | N |
| MAC Address 2 | ... | CEC ID 2 | Smartphone | 2018 | ... | N |
| MAC Address 3 | ... | [Empty] | Dishwasher | 2017 | ... | [Empty] |
| MAC Address 4 | ... | [Empty] | Dishwasher | 2018 | ... | Y |
| ... | ... | ... | ... | ... | ... | ... |

FIG. 4

DEVICE-BASED NOTIFICATION GENERATION

CROSS-REFERENCE TO RELATED APPLICATIONS

This application is a continuation of U.S. patent application Ser. No. 16/141,551, filed on Sep. 25, 2018, which is hereby incorporated by reference in its entirety.

BACKGROUND

An increasing number of different devices may access, and/or be accessible via, communications networks. In addition to computers, media consumption devices, and communication devices, many types of home appliances and other devices (e.g., dishwashers, light bulbs, coffee makers, and similar appliances) may be accessible and/or controlled via a home network. Networked devices may vary in type and age, such that any given household may have a potentially wide range of devices. The specific details of any given networked device may affect the information that a user of that device may need (e.g., product updates, product recalls) and/or information that the user of that device may be interested in (e.g., potential replacement devices, accessories). Because of the large variety of networked devices in use, providing a user with a notification comprising such information may be difficult.

SUMMARY

The following summary presents a simplified summary of certain features. The summary is not an extensive overview and is not intended to identify key or critical elements.

Systems, apparatuses, and methods are described for identifying devices and causing notifications, such as an advertisement and/or a recall notice, based on the identification of the device. A device identification database may store associations between device identifications and device properties. A computing device may be configured to receive a device identification and, using the device identification database, determine device properties corresponding to the device identification. Based on the device properties, the computing device may determine a notification and cause the notification to be sent. Determining the notification may be further based on a user profile corresponding to the user of the device and/or may be based on external information, such as device recall database information and/or user account information. The notification may be sent for insertion into a media content stream, may be sent to the device corresponding to the device identification, and/or may be sent to a device other than the device corresponding to the identification. The notification may, for example, be an advertisement for an upgrade of a first device and/or a notification that the first device is subject to a recall.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4 shows an example device identification database.

DETAILED DESCRIPTION

Figure 1:
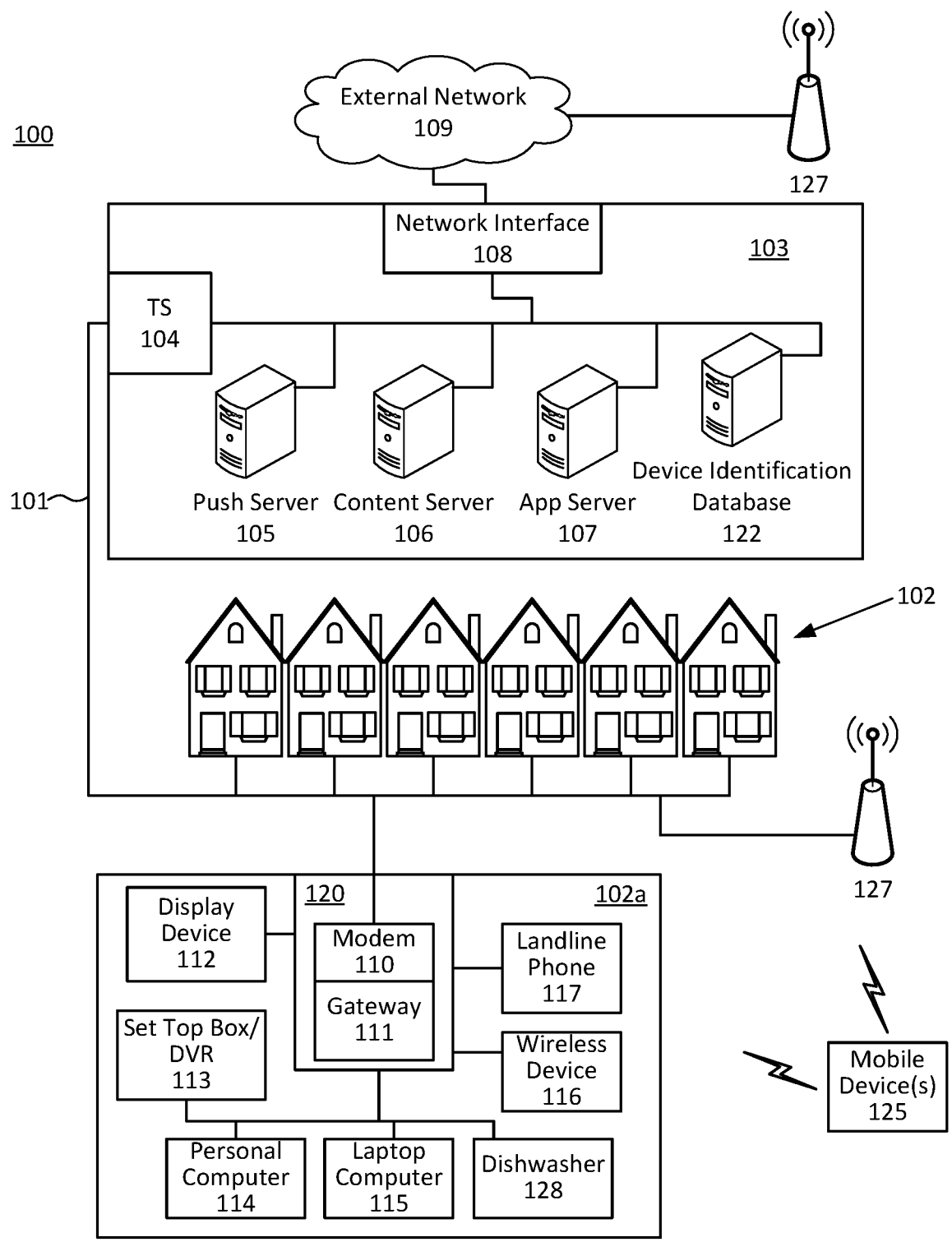
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured to manage communications among those devices, to manage communications between those devices and back-end devices such as servers 105-107 and 122, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as the device identification database 122 (described below), additional push, content, and/or application servers, and/or other types of servers. Although shown separately, the push server 105, the content server 106, the application server 107, the device identification database 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol—VoIP phones), dishwasher 128 and/or other appliances, and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises. The STBs or DVRs 113, personal computers 114, laptop computers 115, wireless devices 116, landline phones 117, dishwasher 128 and/or other appliances may be devices in a household, such as the devices described in FIG. 3.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
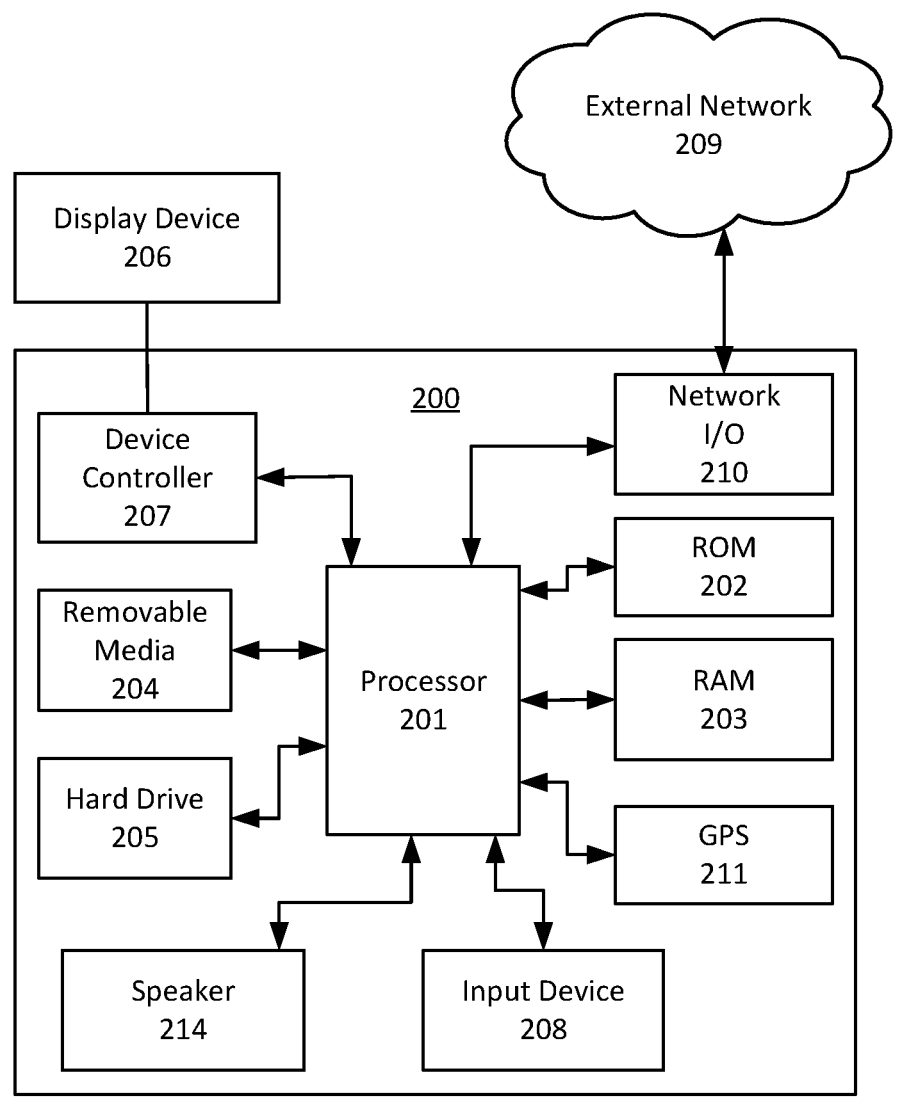
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices of the external network 109), any other computing devices discussed herein (e.g., an administrative computing device such as the administrative computing device 301, a device identification database such as the device identification database 302, a notification source such as one or more of the notification sources 303, a content source such as one or more of the content sources 304, a user database such as the user database 312, an EQAM such as the EQAM 315, any of the devices described in in the household 311, any components of the first network 305 or the second network 306, an appliance having network connectivity, an Internet of Things (IoT) device), and/or any other device performing one or more operations described herein. The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
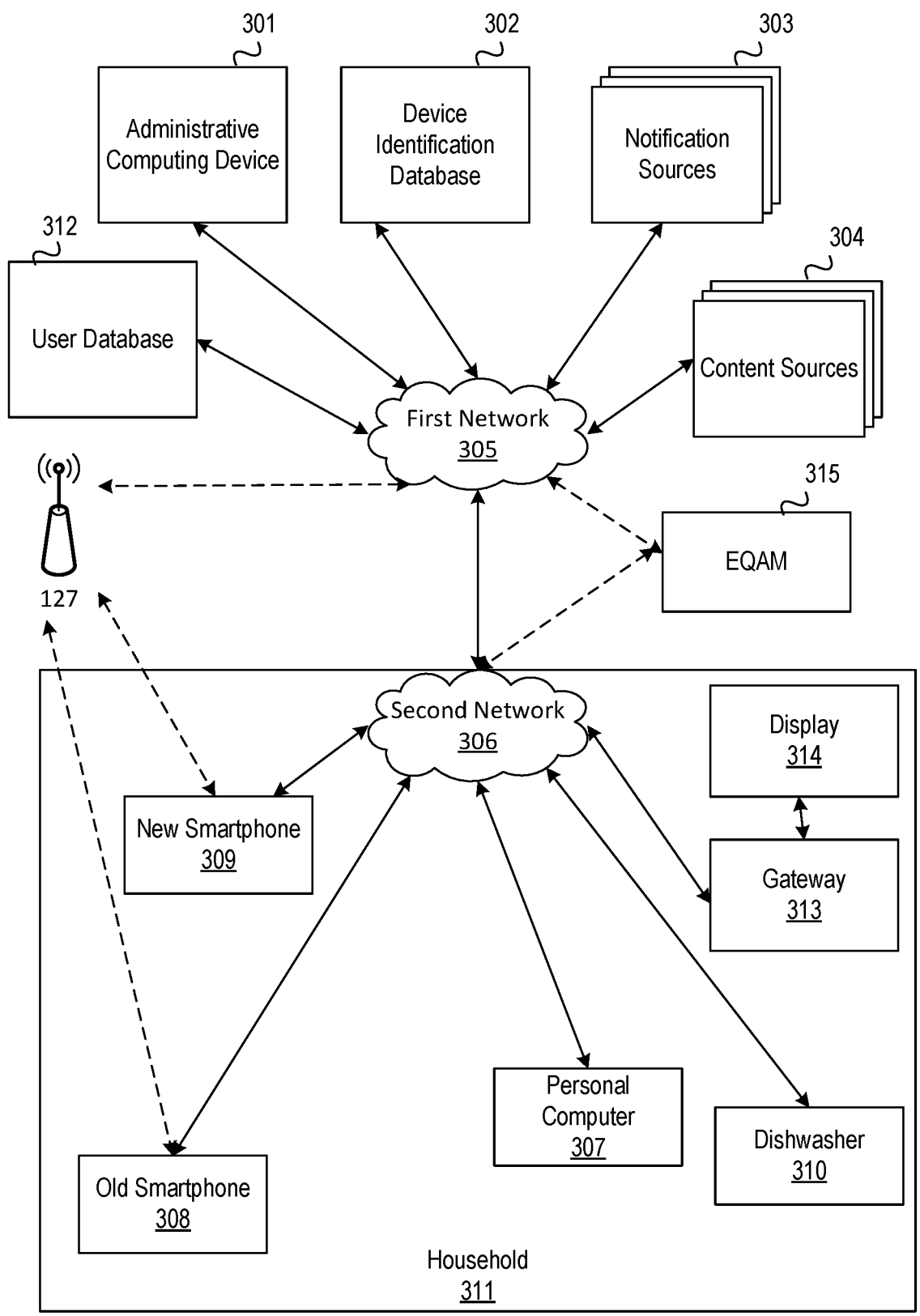
FIG. 3 shows a simplified example network.

FIG. 3 shows an example network comprising a subset of elements shown in FIG. 1. Although the example of FIG. 3 shows multiple occurrences of certain elements, there may alternatively be a single occurrence of such an element. Similarly, elements for which there are single occurrences in the example of FIG. 3 may be implemented as multiple elements. Operations and functions of the elements in FIG. 3 may distributed among the elements of FIG. 3, and/or among one or more other computing devices, in different ways.

A first network 305 may connect an administrative computing device 301, a device identification database 302, notification sources 303, content sources 304, and user database 312. The administrative computing device 301, the device identification database 302, the user database 312, one or more of the notification sources 303, and/or one or more of the content sources 304 may comprise, and/or may be comprised by, some or all of the servers 105-107 and the device identification database 122 of FIG. 1, and/or may comprise (or be comprised by) other servers. The first network 305 may, for example, comprise the communication links 101 and/or the external network 210 and/or other networks. A second network 306 may be connected to the first network 305 and may connect a personal computer 307, an old smartphone 308, a new smartphone 309, and/or a dishwasher 310. The second network 306 may, for example, be a local network in the premises 102a and may comprise the interface 120, the modem 110, and/or the gateway interface device 111. The personal computer 307, the old smartphone 308, the new smartphone 309, and the dishwasher 310 may be located in a household 311 associated with the second network 306. The household 311 may be the same household as premises 102a. The household 311 may comprise additional devices such as, e.g., devices described in connection with the premises 102a of FIG. 1. An edge Quadrature Amplitude Modulator (EQAM) 315 may be part of the first network 305 and may be in communication with the second network 306. The first network 305 may also be connected to the access point 127, which may be in wireless communication with devices in the household 311.

The administrative computing device 301 may be configured to administrate and manage the device identification database 302, the notification sources 303, and/or the content sources 304. For example, the administrative computing device 301 may be used to manage entries in the device identification database 302, configure how notifications are stored, generated, and/or received by the notification sources 303, and/or manage delivery of content from the content sources 304. For example, the administrative computing device 301 may configure one or more rules which govern which notifications, of a plurality of notifications, are sent.

The device identification database 302 may comprise one or more storage devices and/or databases that are configured to store associations between device identifications and device properties. The device identification database 302 may associate device identifications with device properties, such as device recall information. The device identification database 302 may allow devices, such as the administrative computing device 301, to query the device identification database 302.

The notification sources 303 may store, generate, and/or retrieve notifications. Notifications may be used to communicate various types of information. For example, notifications may be associated with device recalls. As another example, notifications may comprise advertisements, e.g., one or more of the notification sources 303 may be configured to generate an advertisement for a new smartphone based on device properties indicating an old smartphone. One or more of the notification sources 303 may be configured to send the notification directly to a device in the household 311 (e.g., to the gateway interface device 111), to the access point 127, and/or to the EQAM 315, for combination with content from one or more of the content sources 304. For example, one or more of the notification sources 303 may be configured to send a notification to the EQAM 315, which may be configured to combine the notification with content received from the content sources 304 (e.g., media content) and send the combined content and notification to a device in the household 311 (e.g., the personal computer 307 or the gateway 313). As another example, one or more of the notification sources 303 may be configured to send a graphic advertisement to a user by sending the notification to the access point 127, which may combine the message with content (e.g., website content from one or more of the content sources 304) and send it to the new smartphone 309 for display on a smartphone-based web browser. As yet another example, one or more of the devices in the household 311 may combine content received from one or more of the content sources 304 and notifications received via one or more of the notification sources 303, and cause the combined content and notification to be output via a display (e.g., display 314). The administrative computing device 301 may retrieve and/or send notifications via one or more of the notification sources 303.

The content sources 304 may be configured to send content to one or more devices, such as in the household 311. For example, one or more of the content sources 304 may store media content (e.g., a movie) which may be combined with notifications by the EQAM 315, the access point 127, the gateway 313, or another device. As another example, one or more of the content sources 304 may store website data which may be combined by the access point 127, the personal computer 307, or another device along with notification information, such as a text or image advertisement. The content stored by the content sources 304 may indicate areas where notifications may be inserted. For example, a website stored by one or more of the content sources 304 may comprise a designated area for a notification.

The user database 312 may comprise a database configured to store information about user accounts. Such user accounts may correspond to one or more services which may be associated with devices. For example, the user database 312 may be maintained by an Internet Service Provider (ISP) as part of providing the personal computer 307 access to the Internet, and the user database 312 may store information corresponding to users, such as the users' home addresses and telephone numbers. The user database 312 may be further configured to store information correlating user accounts with devices. For example, the user database 312 may comprise a listing of devices owned by a user (e.g., a listing of indications of devices detected on the second network 306 and associated with a user account). The administrative computing device 301 may be configured to develop a user profile corresponding to a user or a user account by, for example, storing in the user database 312 correlations between the user and/or user account and one or more device indications and/or device properties. For example, the administrative computing device 301 may determine a user profile indicating that a user prefers a certain brand of smartphone based on storing device indications in the user database 312, analyzing such stored device indications, and determining that all smartphones analyzed have the same brand.

The personal computer 307, the old smartphone 308, new smartphone 309, and the dishwasher 310 are examples of devices which may have different device identifications and different device properties. Device identifications may be unique to specific devices or shared among devices. Devices may have more than one device identification: each device may have a different device identification, and/or two devices may share the same or a similar device identification. The device identification may be provisioned by a networking device and may be unique to the first network 305 or the second network 306. Device identifications may also or alternatively be assigned when a device is manufactured.

Device properties may be unique to specific devices or shared among devices, and devices may have more than one device property. For example, the personal computer 307 and the new smartphone 309 may both have a native screen resolution of 1920×1080 pixels; however, the personal computer 307 may have a headphone port, whereas the new smartphone 309 may lack a headphone port. As another example, a device identification may indicate a type of device (e.g., that the old smartphone 308 is a particular brand and model of smartphone), such that the old smartphone 308 and new smartphone 309 share a same or similar device identification.

A device may be configured to report information corresponding to the device to other devices and/or the administrative computing device 301. The reported information may indicate a configuration of the device, properties of consumable elements of the device, and/or other operational information of the device. This reported information may be related to, but need not be the same, as the device properties. For example, a device may have a native screen resolution of 1920×1080 pixels, but a user may have configured the device to display at a resolution of 1280×720 pixels. As another example, the device properties may indicate that a device has a battery of a specific size (e.g., 2,900 mAh), and the device may be configured to report a current charge status (e.g., 50% battery remaining).

Devices may be configured to report device identifications and/or device properties and/or reported information of other devices. A device may allow a user to input device properties and submit those properties to the device identification database 302. For example, the user may have built the personal computer 307 out of various components, and entry of the properties may comprise indicating what components (e.g., motherboard, video card) have been installed. A device may be configured to, independently and/or responsive to a request, submit device identifications and/or device properties to the device identification database 302. For example, a router (not pictured) may be configured to monitor device identifications (e.g., Media Access Control (MAC) addresses, Internet Protocol (IP) addresses) of devices on a network and submit such device identifications to the device identification database 302. A device may be configured to send information reported from one device to another device. For example, the dishwasher 310 may send operational information to the personal computer 307, which may cause the operational information to be sent to the administrative computing device 301.

FIG. 4 shows example of data 400 which may be stored by the device identification database 302. The data 400 shown in FIG. 4 comprises device identifications 401.1 to 401.$n$, where n is an integer. The data 400 shown in FIG. 4 further comprises device properties 402.1 to 402.$m$ corresponding to the device identifications, where m is an integer. Each row in FIG. 4 corresponds to a device. Using the data 400, one or more device identifications may be associated with device properties. A device need not have an entry in every column of the table in FIG. 4. For example, some devices may only have one type of identification, while another device may have multiple types of identifications. As another example, all properties need not apply to every device. Though the data 400 is shown in a table in FIG. 4, data 400 may be stored and/or maintained in various arrangements.

In the example shown in FIG. 4, two types of identification are shown: a MAC address (corresponding to column 401.1) and an indication used by the Consumer Electronics Control (CEC) feature of a High-Definition Multimedia Interface (HDMI) interface (corresponding to 401.$n$). Device identifications may be any form of information identifying a device at any level of granularity. For example, MAC addresses, IP addresses, Unique Device Identifiers (UDID), International Mobile Equipment Identities (IMEI), DevEUI and DevAddr values specified in the LoRaWAN protocol, and the Extended Display Identification Data (EDID) used in, e.g., digital display interfaces may all be device identifications. While some device identifications may be very specific about the nature of a device (e.g., its manufacturing date, model number), other device identifications may be less specific (e.g., a device identification suggesting that a device was made by a particular company). A device identification may comprise an arbitrary number, text field, network configuration property (e.g., IP address), and/or other data. For example, a device identification may comprise the first 24 bits of a MAC address, known as the Organizational Unique Identifier (OUI) portion of the MAC address. The OUI portion uniquely identifies the manufacturer of a device such that, while the OUI portion may not identify a particular device, it may be used to identify a category of devices. As such, device identifications such as the OUI portion of a MAC address may be shared by multiple devices. As another example, the device identification may be a value extracted from the Consumer Electronics Control (CEC) feature of a High-Definition Multimedia Interface (HDMI) interface associated with the device. Such values extracted from the CEC feature may indicate the make or model of a device, such as a television, in plain text. The device identification received need not be complete. For example, a device may send the OUI portion of its MAC address but no other portions of its MAC address.

Device identifications may be retrieved in a manner based on the nature of the device identifier. Device identifications may be retrieved from one or more different computing devices. For example, a MAC address may be retrieved via a device on a network, such as a router. As another example, a device identifier associated with the CEC feature of an HDMI interface may be retrieved from a television or other media device, which may be configured to send the information at periodic intervals and/or upon request.

In the example shown in FIG. 4, three device properties are shown: a device type (corresponding to column 402.1), a manufacturer year (corresponding to column 402.2), and a recall status (corresponding to column 402.m). Device properties may comprise any description or property of a device. Properties may relate to the physical aspects of a device, such as a screen resolution, whether or not a screen of the device is HD-capable, the speed and/or capabilities of a processor, memory capacity, and/or available input devices. Properties may relate to the manufacture of a device, such as a manufacturing date, the identity of the manufacturer, and/or the location (e.g., country) of manufacture. Properties may relate to the software of a device, such as an operating system type and version, the type and version of other installed software, and/or the software requirements of a device. Properties may relate to the maintenance of a device, such as a recall status, whether an update is available, whether a new model is available, accessories available for the device, and/or whether a network operator has stopped or may stop supporting the device. Properties may relate to the usage of a device, such as an average hours per day used, a time period when the device is commonly used, and/or average bandwidth and/or power consumption when used. Not all properties may correspond to every device, and some device properties may be unavailable.

In the example shown in FIG. 4, a device type may, for example, indicate that two devices are smartphones (e.g., rows 403a and 403b) and that two devices are dishwashers (e.g., rows 403c and 403d). A manufacturing year may indicate when a device was manufactured, which may be used to determine an age of the device. A recall status may indicate if a device is subject to a recall.

The data 400 need not be complete and/or comprehensive. For example, entries (e.g., the entry for the CEC in rows 403c and 403d, and the entry for recall status in row 403c) may be incomplete or empty. Information may be incomplete or broad such that, for example, the data 400 may indicate that a device was manufactured in the years ranging from 2012 to 2014, but not indicate the particular year of manufacture. The device identification database 302 may be configured to identify and query other devices to improve the accuracy of such entries.

The data 400 may be based on information acquired from device users and/or other sources. A user of a device may provide information about a device which correlates a device identification with one or more device properties. For example, a user may connect to a network using a device and be prompted to provide information (e.g., make, model, year purchased) about the device. That information may be stored in the data 400. As another example, the device identification database 302 may receive, from a device manufacturer, an indication of a recall of a device. As yet another example, the device identification database 302 may receive, from another database comprising information regarding a plurality of accessory products, information correlating devices with accessory products, such that the data 400 may comprise information correlating device identifications with accessory products.

The data 400 may be modified over time. One or more computing devices may be configured to modify entries. For example, an entry may, via a computing device, be updated such that an entry indicating that a device is not subject to recall may be updated to indicate that the device is subject to a recall. A device property may be updated based on a prediction of the status of the device. One or more computing devices may be configured to make changes to the data 400. For example, the data 400 may be modified by a device (e.g., the administrative computing device 301) based on a prediction that an older device's estimated battery capacity is likely lower than it was when originally sold.

Device properties need not relate solely to the technical specifics of a device, but may be information determined regarding a device. Over time, the administrative computing device 301 may learn about a device and add information to the data 400. For example, the data 400 may comprise an average transmission speed of a device, and the administrative computing device 301 may, based on information received from a plurality of such devices, add such information to the data 400. As another example, the administrative computing device 301 may be associated with an Internet Service Provider (ISP) that offers multiple forms of connectivity (e.g., Third Generation (3G) and LTE wireless mobile communications technologies), and the administrative computing device 301 may specify which form of connectivity should be provided to a particular device.

Figure 5:
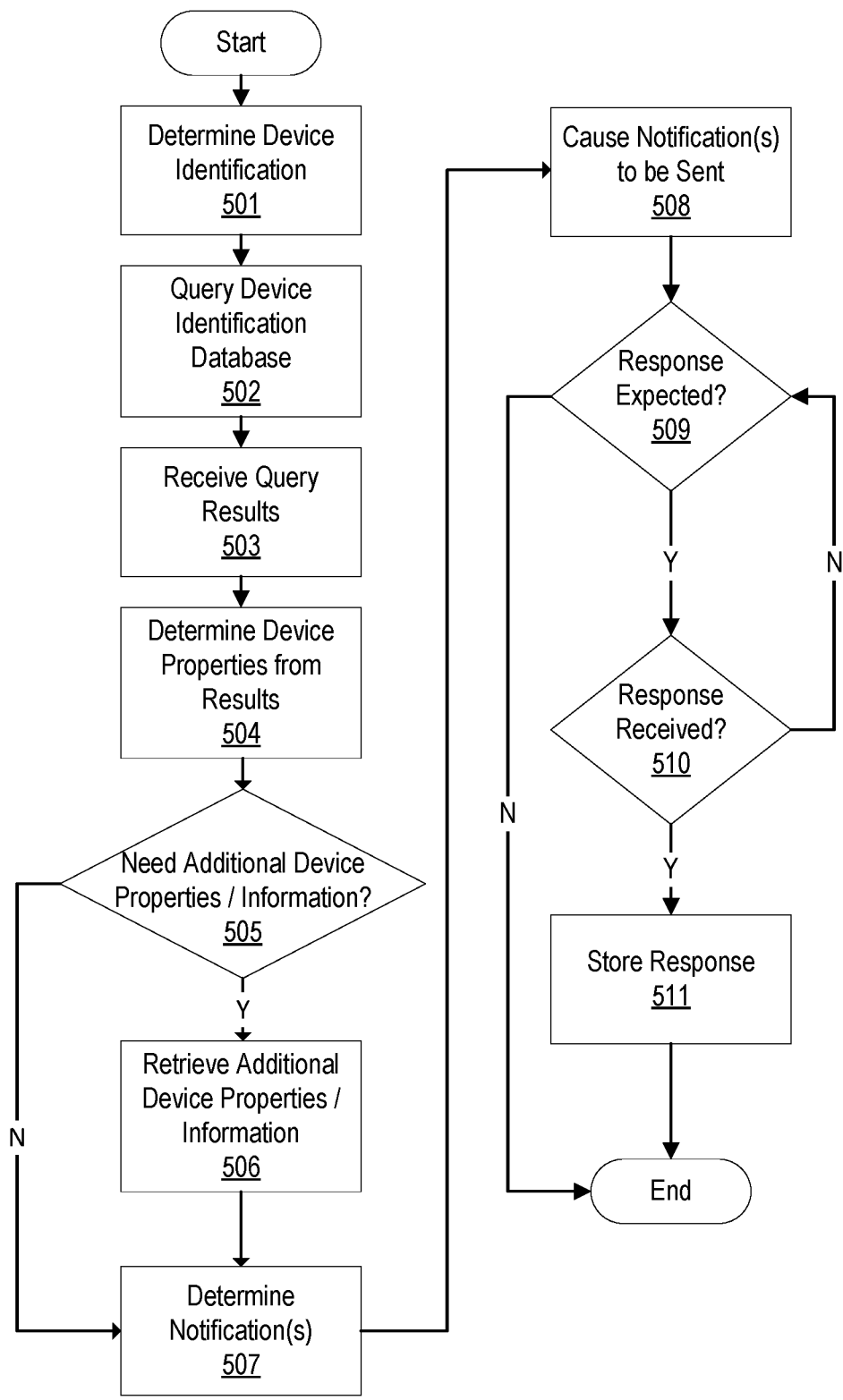
FIG. 5 is a flow chart showing an example method for determining and sending a notification.

FIG. 5 is a flow chart showing an example method for sending one or more notifications based on device properties associated with device identifications. Although the administrative computing device 301 may perform steps in the example of FIG. 5, some or all of those steps may be performed by one or more other computing devices. In step 501, the administrative computing device 301 may determine a device identification corresponding to a device. The administrative computing device 301 may be triggered to make the determination based on one or more different occurrences. For example, the device identification may have been received in response to a query of another device. For example, the administrative computing device 301 may query a router to request the MAC addresses of all devices connected to the router. The administrative computing device 301 may be configured to periodically determine if a notification should be sent and, in response, determine one or more device identifications. The administrative computing device 301 may determine one or more device identifications in response to a flag being set (e.g., a flag indicating that all devices of a certain model should be notified of a recall). Step 501 may comprise receiving a device identification based on an action taken by a corresponding device, such as logging into a network and/or accessing content. The administrative computing device 301 may be queried by another device such that, for example, the other computing device may send one or more device identifications to the administrative computing device 301.

In step 502, the administrative computing device 301 may query the device identification database 302 for device properties corresponding to the device identification. The device properties may comprise recall information, device updates, accessory product information, or other information corresponding to the device identification. The manner in which the device identification database 302 may be queried may depend on the nature of the device identification database 302. For example, the query may be a Structured Query Language (SQL) query. An exact match need not be found. For example, a longest match search may be performed on the device identification database 302. The query may comprise a request for one or more specific device properties. For example, a query may comprise a device identification and an indication that screen resolution information is desired. A query may be a request for all device properties.

In step 503, device properties corresponding to the device information may be received. The nature and formatting of device properties received in response to the query may depend on the nature of the device identification database 302. For example, if the device properties correspond to a product recall, the device properties may comprise an indication that a recall exists, or may indicate both that a recall exists and the reason for the recall. If the query in step 502 requested particular device properties, the information received may comprise such device properties. Additional processing of the query results may be performed in order to decompress, extract relevant information from, augment, and/or otherwise process the query results.

In step 504, particular device properties may be determined from the query results received. The query results may contain one or a plurality of device properties, but the administrative computing device 301 may need only certain device properties. As such, some or all portions of the device properties received may be modified, stored, ignored, and/or discarded. As an example, if a manufacturing year is required to determine the age of a device but the device properties specify the exact date of manufacture, only the year of manufacture may be determined and the remaining data may be ignored and/or discarded.

In step 505, the administrative computing device 301 may determine if additional device properties and/or information corresponding to a device is needed. Device properties may not be determinable from the query results received if, for example, all or portions of the fields for the device in the device identification database 302 are empty. For example, the query may request a screen resolution, and the query results may indicate that the screen resolution is not known. As another example, if manufacturing year is required to determine the age of a device but that information is not stored by the device identification database 302, additional device properties may be required. Additional types of information may be required as well. Such information may be retrieved from other sources. For example, a notification promoting a new waterproof smartphone may become relevant depending on whether it is currently raining at a user's home. So that the appropriateness of such a notification can be determined, step 506 may comprise retrieving an indication, from a weather information database, of whether it is currently raining at a user's home. If additional device properties and/or information is needed, the process may proceed to step 506. Otherwise, the process may proceed to step 507.

If additional device properties and/or information is needed, in step 506, the administrative computing device 301 may receive the additional device properties and/or information. The administrative computing device 301 may, using the device identifier and/or known device properties, look up unknown device properties and/or other information (e.g., using external databases and/or by querying the device), and/or may request that the user provide such information. For example, the administrative computing device 301 may cause the device to visit a website such that Hypertext Transfer Protocol (HTTP) header information (e.g., the USER_AGENT field) may be used to determine device properties. As another example, the administrative computing device 301 may cause the user of a device to be asked about the device (e.g., whether the device is a laptop or desktop computer). As yet another example, the administrative computing device 301 may query a weather database to determine the weather in a location associated with the device. Receiving additional device properties and/or information may comprise requesting and/or receiving reported information corresponding to a device, e.g., a current battery level or a location.

In step 507, based on the device properties, one or more notifications may be determined. A notification may be retrieved from a source, such as one or more of the notification sources 303, and/or may be generated, such as by applying text to one or more images retrieved from one or more of the content sources 304. For example, if the device properties indicate that an accessory product for the device is available, a notification may comprise an advertisement for that accessory product as retrieved from an advertisement server.

A notification may be based on the device properties of a device. A notification may, based on the device properties indicating that a device is subject to a recall, notify the user of the device of the recall. A notification may, based on the device properties indicating that the device is older than a threshold, advertise a new version and/or type of the device. A notification may, based on the device properties indicating that the device is made by a certain manufacturer and/or has certain capabilities, advertise products which may be used with the device and/or notify the user of the device of device functionalities (e.g., device tips and tricks).

A notification may be based on external information received from sources other than the device identification database 302. Such external information may comprise, for example, information corresponding to a user of the device (e.g., a tier of an account, demographic information corresponding to the user), a current physical location of the device, and/or weather information. Such external information may be retrieved in step 506. This external information may be compared to device properties received from the device identification database 302. For example, based on receiving external information indicating that it is about to rain and device properties suggesting that a device is waterproof, the notification may inform the user that the device may be used in the rain.

A notification may be based on the device properties of multiple devices. A notification may be based on device properties of different devices in a household. For example, based on determining that the user is associated with a plurality of devices which use a first operating system, a notification may advertise other devices also compatible with the same operating system. As another example, upon detecting, based on device properties and/or stored device identifications, that a user has recently purchased a new smartphone and new speakers, a notification may comprise an advertisement for a smartphone dock which allows the user to easily connect the smartphone to the speakers.

A notification may be based on times associated with the device identification and/or device properties. One or more device identifications may be received, and device properties determined, only at certain times. For example, a babysitter's smartphone may connect to a household network during the day, but not at night. A notification may be based on the time period associated with the device identification and/or device properties such that, for example, notifications corresponding to the babysitter's smartphone are only sent when the babysitter is in the household.

A notification may be based on content made available and/or sent to a user of a device. For example, a recall notification configured for display on a television may be determined when the television is displaying an electronic program guide, but, if the television is tuned to a premium channel (e.g., a movie channel), the notification may be configured to display after the television has tuned to another channel. As another example, if the user has a limited ability to receive text messages, the notification may be configured to be sent as an e-mail rather than as a text message. As yet another example, a notification comprising an advertisement for a new dishwasher may be based on a recent home improvement television show, featuring the dishwasher, which was watched by the user.

A notification may be based on a user profile corresponding to the user of the device. The user profile may be based on device identifications and/or device properties corresponding to the user. Such indications may be stored in a user profile. Based on this user profile, the notification may change. For example, device properties may indicate that a user prefers mid-range smartphones over low-end smartphones, and a notification may comprise an advertisement for a new mid-range smartphone, rather than a new low-end smartphone. The user profile may comprise associations made between device properties corresponding to different devices. For example, the user profile may comprise an indication that the user prefers to use wireless audio products based on device identifications and/or device properties suggesting that the user lives in a household with multiple wireless speakers and wireless headphones.

A notification need not be configured for the device corresponding to the device properties. For example, a notification for a television (e.g., a television advertisement) may be determined based on smartphone device properties. As another example, a text message notification may be determined for a smartphone based on determining that device properties of a dishwasher suggest that the dishwasher is subject to a recall.

In step 508, the administrative computing device 301 may cause the one or more notifications to be sent. A notification need not be sent to the device corresponding to the device properties received. For example, a notification for a refrigerator may be sent via text messages to a smartphone. The particular manner in which a notification is sent may depend on the nature of the notification. For example, while a notification advertising an accessory product may be inserted into a website or application interface, a notification regarding the recall status of a device may be sent in a different manner (e.g., a text message) to a smartphone. As another example, an advertisement may be sent to a set-top box, which may insert the advertisement in a media stream (e.g., to be displayed in the corner of a currently-playing show), but a detailed recall notice may be sent via e-mail.

Sending may comprise causing a notification to be inserted into a media content stream. This may further comprise causing a notification to be sent to a device (e.g., the EQAM 315, the access point 127, the devices in the household 311, etc.), which may be configured to combine the notification with content (e.g., media content, website content) such that the notification appears as part of the content (e.g., overlaid on a video, inserted between segments of video, inserted into a web page). The manner of combination may depend on the nature of the content. For example, combining a notification and content may comprise sending both as packets in an IP layer, editing an image to add the notification to the image, editing a video stream to add additional video content (e.g., an advertisement) to the video stream, or the like.

In step 509, the administrative computing device 301 may determine whether a response to the one or more notifications is expected. A notification may comprise a request for a response by the user, such that a response to the notification may be expected. For example, if a notification is a pop-up message displayed on a television, the notification may comprise an "OK" button. As another example, if a notification is a text message displayed on a smartphone, the user may respond to the text message via a second text message. If a response is expected, the process may proceed to step 510 and determine if the response is received. Otherwise, the process may end.

If a response is received in step 510, in step 511, the response may be stored. The response may be stored in, for example, the user database 312. For example, a user may receive a recall notice, acknowledge the recall notice, and the acknowledgement may be stored in the user database 312. A second notification may be determined and sent based on the response received. For example, a user may provide a response asking to never see a type of advertisement notification again, and a second notification acknowledging the request may be sent to the user. As another example, if the response indicates interest in a new product, the response may be stored so that the user may be provided with more information about the new product.

Figure 6:
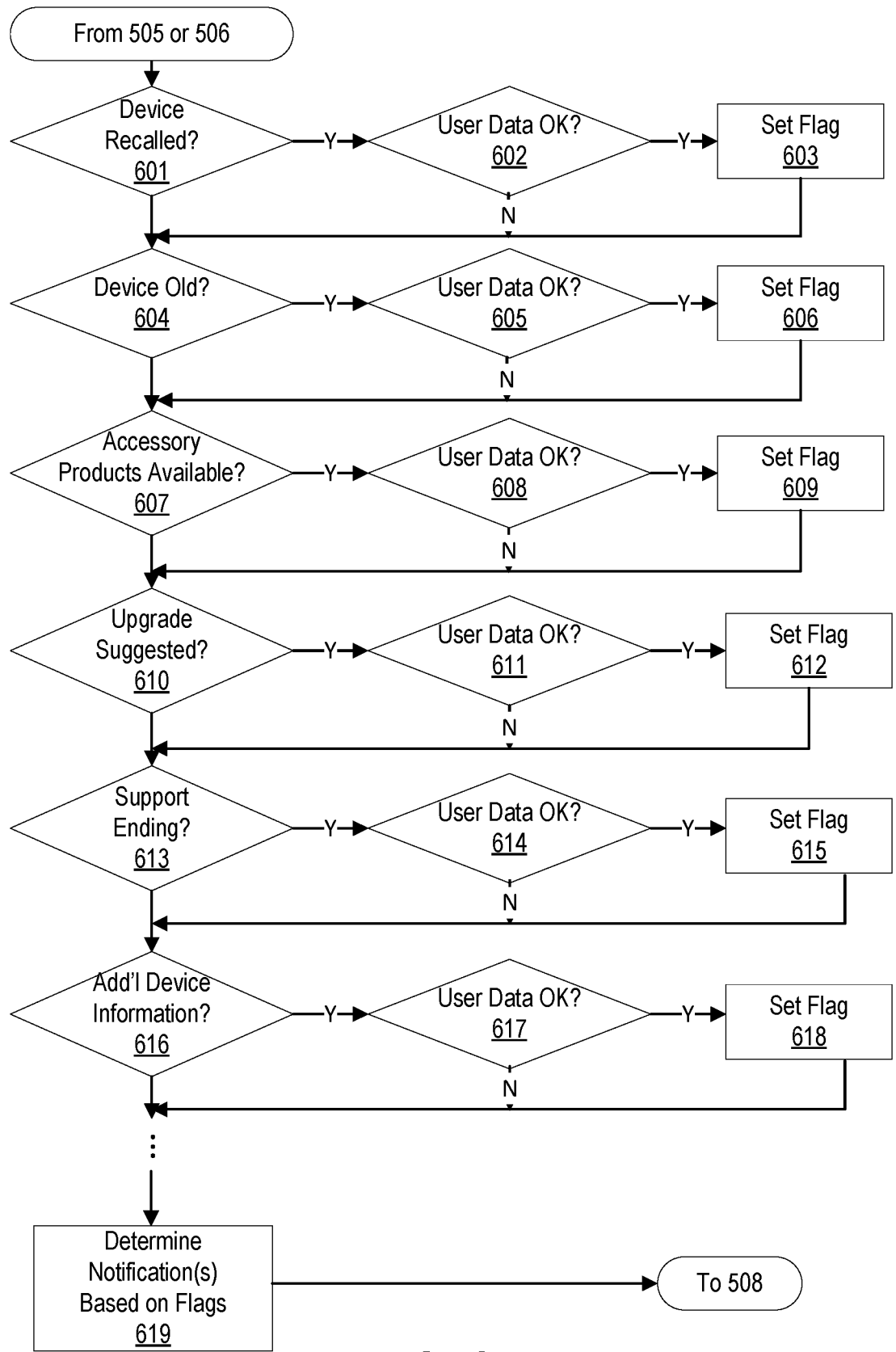
FIG. 6 is a flow chart showing an example method of determining a notification.

FIG. 6 is a flow chart showing an example of steps which may be performed when determining one or more notifications in step 507. FIG. 6 is an example, and any number of steps may be performed as part of step 507. Moreover, the example flow chart in FIG. 6 may be rearranged: for example, determining whether accessory products are available (e.g., step 607) may be performed before determining whether a device is old (e.g., step 604). Similarly, steps may be added or omitted. Although the administrative computing device 301 may perform steps in the example of FIG. 6, some or all of those steps may be performed by one or more other computing devices.

In step 601, the administrative computing device 301 may determine whether, based on the device properties and/or the external information, the device is subject to a recall. The recall may comprise a warning about the device. For example, the recall notice may merely state that the device is not for use in certain conditions (e.g., in extreme cold).

If the device is subject to a recall, in step 602, the administrative computing device 301 may analyze user data (e.g., from the user database 312) corresponding to the device to determine whether to send a notification. A user may have already seen a notification, may have requested to not receive notifications of a certain type, or may otherwise be associated with information indicating that a notification should or should not be sent. If the user data indicates that the notification should be sent, the process may proceed to step 603. Otherwise, the process may proceed to step 604. In step 603, in response to determining that the device is subject to a recall and that the notification should be sent, the administrative computing device 301 may set a flag corresponding to a recall notification. The flag may be a Boolean indication that a notification corresponding to one or more recall notices should be sent.

In step 604, the administrative computing device 301 may determine whether, based on the device properties and/or the external information, the device is old. This determination may comprise determining whether a date corresponding to the device satisfies a threshold. Additionally or alternatively, this determination may comprise determining whether a property of the device suggests that the device is old (e.g., that a smartphone uses an older form of wireless communications, or that a laptop runs an older operating system). In step 605, the administrative computing device 301 may determine whether to send a notification based on user data. Such decisions may be based in part on a user profile corresponding to the user of the device. For example, if the user profile indicates that the user rarely purchases new devices, the threshold for determining that the device is old may be increased. As another example, if the user profile indicates that the user likes to purchase new devices regularly, the threshold for determining that the device is old may be decreased. If the device is determined to be old, and if the user data indicates in step 605 that a notification should be sent, a corresponding flag may be set in step 606. Otherwise, the process may continue to step 607.

In step 607, the administrative computing device 301 may determine whether, based on the device properties and/or the external information, accessory products are available for the device. Accessory products need not suggest a replacement of the device, but may complement and/or relate to that device. In step 608, the administrative computing device 301 may determine whether to send a notification based on user data. Such decisions may be based in part on a user profile corresponding to the user of the device. For example, based on determining, using the device properties and the user profile, that a user purchased a new networked dishwasher and networked stove, the notification may relate to purchasing new dishes and/or silverware. As another example, based on determining that a user has recently installed a number of networked security cameras, security-related products like new locks may be advertised. If accessory products are available, and if the user data indicates in step 608 that a notification should be sent, a corresponding flag may be set in step 609. Otherwise, the process may continue to step 610.

In step 610, the administrative computing device 301 may determine whether, based on the device properties and/or the external information, to suggest an upgrade. The device properties and/or the external information may suggest that a device is older than a threshold, that the device lacks certain functionality, or may otherwise suggest that the device is inferior to newer devices. If the administrative computing device 301 determines to suggest an upgrade, and if the user data indicates in step 611 that a notification should be sent, a corresponding flag may be set in step 612. Otherwise, the process may continue to step 613.

In step 613, the administrative computing device 301 may determine whether, based on the device properties and/or the external information, support has ended or may end for the device. For example, software and/or hardware developers and/or network operators may terminate support for devices and software executing on such devices, which may be undesirable in, for example, an enterprise environment where up-to-date security protection is critical. If the administrative computing device 301 determines that support has ended or may end for the device, and if the user data indicates in step 614 that a notification should be sent, a corresponding flag may be set in step 615. Otherwise, the process may continue to step 616.

In step 616, the administrative computing device 301 may determine whether additional information corresponding to the device exists. A device may be configured to report information about itself, e.g., to one or more second devices. For example, a printer may report a level of ink left in a printer cartridge to a personal computer, a smoke detector may report a current battery level to an Internet of Things hub, and/or a laundry machine may report a number of times it has washed clothes in a time period to a smartphone. Such reporting may be periodic (e.g., sending battery status information every hour). The administrative computing device 301 may receive and store the information to make determinations about the reported information. For example, a dishwasher may be configured to report every instance in which it is used to wash dishes, and the administrative computing device 301 may store this information to determine, for example, how many times the dishwasher has been used in a time period. Such reported information may be received by the administrative computing device 301 and correlated and/or compared with the external information. For example, a smoke detector may indicate that it received a new battery 11 months ago, and the external information may indicate that a particular 9V battery used by the smoke detector typically expires within 12 months. As another example, a dishwasher may report that it has performed nineteen washing cycles in the last month, and the external information may indicate that a user of the dishwasher bought a 20-pack of dishwashing detergent pods. As yet another example, an inkjet printer may indicate to a laptop that it is running low on ink, and that indication may be sent to the administrative computing device 301. Based on the reported information and/or the external information, the administrative computing device 301 may determine to provide a notification to a user of the device. For example, the administrative computing device 301 may determine to notify the user that he or she should purchase a new printer cartridge, 9V battery, box of detergent pods, or the like. Such a notification may, for example, comprise an advertisement with a discount code. If the administrative computing device 301 determines to send a notification based on the reported information, and if the user data indicates in step 617 that a notification should be sent, a corresponding flag may be set in step 618. Otherwise, the process may continue to step 619.

As indicated by the vertical ellipsis following step 616, additional sequences of operations comprising a determination of whether a particular notification may apply, a check of user data, and setting of a flag (e.g., similar to steps 601-603, to steps 604-606, to steps 607-609, to steps 610-612, to steps 613-615, and/or to steps 616-618) may be added for any number of other types of notifications.

In step 619, based on the flags set in steps 603, 606, 609, 612, 615, and/or 618, and/or in other similar steps, and based on the device properties and/or the external information, the administrative computing device 301 may determine one or more notifications. Flags may be analyzed such that notifications corresponding to some flags may be sent, whereas notifications corresponding to other flags may be not sent. For example, the administrative computing device 301 may only be capable of sending two notifications, but four flags for four notifications may be set, such that two of the four must be selected by the administrative computing device 301. Flags may be prioritized such that, for example, a recall notice is more likely to be sent than an advertisement. Flags may be conditional such that, for example, a flag may indicate that a notification must be sent alone and not with other notifications.

An administrator may configure the decision-making process in step 619 to determine notifications based on one or more rules. Rules may determine, for example, that certain flags correspond to higher priority notifications than others, that some flags are to be ignored absent others being set, which notifications may be sent at the same time, and other similar configurations. Flags may comprise an indication of a level of importance (e.g., an integer value between zero and ten, with ten being the highest importance value).

The administrative computing device 301 may be configured to prioritize a notification based on the importance of the notification. The administrative computing device 301 may be configured to ensure that recall notifications are always displayed if a device has been recalled. The administrative computing device 301 may be configured to prioritize different advertisements based on the amount paid for the advertisement and/or the newness of the advertisement.

The administrative computing device 301 may be configured to prioritize a notification based on a user profile. A user profile may designate certain notification types as more or less important, and a flag corresponding to a notification may be accordingly prioritized higher or lower as compared to other flags. For example, if a user profile indicates that the user has children, safety notifications may have correspondingly higher priority (and higher-weighted flags) as compared to other notifications. As another example, the administrative computing device 301 may be configured to never display advertisements if, based on information from the user database 312, the user of the device is associated with a premium subscription service. Different advertisements may be prioritized based on the tastes of the user, which may be determined based on the user profile. For example, an advertisement for menswear may be prioritized low if the user profile indicates an all-female household. If, based on a user profile, the administrative computing device 301 determines that a user is more likely to respond to a certain type of notification, that type of notification may be prioritized.

The administrative computing device 301 may be configured to prioritize a notification if it has been considered but not sent previously. For example, a recall notification may be determined and sent, such that a flag corresponding to an advertisement may be ignored or discounted and, in a later notification determination, the flag corresponding to the advertisement may be prioritized.

The administrative computing device 301 may be configured to prioritize notifications based on the devices available to display the notifications. For example, if a smartphone is muted, a notification that requires sound may have a lower priority than a notification that does not require sound. If a device has a low amount of available bandwidth, notifications which require lower amounts of bandwidth may be prioritized over notifications which require higher amounts of bandwidth. Some notifications may be configured for only a certain set of devices, and the administrative computing device 301 may prioritize notifications based on whether a particular device associated with a user is in the certain set of devices.

The administrative computing device 301 may be configured to select a device, of a plurality of devices, to send a notification to. A plurality of devices may be available for receipt of notifications. The administrative computing device 301 may, during the decision-making process in step 619, select a first device of a plurality of devices and send a notification to the first device. The first device may be selected based on the nature of the notification. For example, a video notification may be displayed on a television, rather than a smartphone. The first device may be selected based on available bandwidth. For example, an Ethernet-connected personal computer may be selected over a smartphone using an expensive wireless communications network. A device which may display multiple notifications may be selected over a device which may only display one or a limited number of notifications. A device which may be used more by a user may be selected over a device rarely used by the user.

Although examples are described above, features and/or steps of those examples may be combined, divided, omitted, rearranged, revised, and/or augmented in any manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   receiving, by a first computing device and from a network device, a list of one or more devices connected to the network device, wherein the list indicates a device identification of a second computing device;
   determining, based on the device identification of the second computing device and based on information associating one or more device identifications with one or more device properties, a year of manufacture of the second computing device;
   determining, based on a determination that the year of manufacture of the second computing device satisfies a threshold, one or more notifications; and
   causing sending of the one or more notifications.

2. The method of claim 1, further comprising:
   causing the one or more notifications to be inserted into a content stream to be sent to one or more devices.

3. The method of claim 1, wherein the causing sending comprises
   causing sending, to a third device associated with the second computing device, of the one or more notifications.

4. The method of claim 1, wherein the one or more notifications are further determined based on a determination that a software version, associated with the second computing device, matches a predetermined software version.

5. The method of claim 1, further comprising:
   determining, based on one or more device properties of the second computing device, a plurality of notifications; and
   determining, based on a user profile, one or more prioritized notifications of the plurality of notifications, wherein the user profile indicates sending the one or more prioritized notifications instead of at least another notification of the plurality of notifications,
   wherein the causing sending comprises causing sending of the one or more prioritized notifications.

6. The method of claim 1, further comprising:
   determining, based on content of the one or more notifications and a type of the second computing device, a method of sending the one or more notifications.

7. The method of claim 1, further comprising:
determining, based on the year of manufacture of the second computing device, that the second computing device is subject to a recall, wherein the one or more notifications comprise an indication of the recall.

8. An apparatus comprising:
one or more processors; and
memory storing instructions that, when executed by the one or more processors, cause the apparatus to:
receive, from a network device, a list of one or more devices connected to the network device, wherein the list indicates a device identification of a computing device;
determine, based on the device identification of the computing device and based on information associating one or more device identifications with one or more device properties, a year of manufacture of the computing device;
determine, based on a determination that the year of manufacture of the computing device satisfies a threshold, one or more notifications; and
cause sending of the one or more notifications.

9. The apparatus of claim 8, wherein the instructions, when executed by the one or more processors, cause the apparatus to:
cause the one or more notifications to be inserted into a content stream to be sent to one or more devices.

10. The apparatus of claim 8, wherein the instructions, when executed by the one or more processors, cause the apparatus to:
cause sending by causing sending, to a device associated with the computing device, of the one or more notifications.

11. The apparatus of claim 8, wherein the instructions, when executed by the one or more processors, cause the apparatus to:
determine the one or more notifications further based on a determination that a software version, associated with the computing device, matches a predetermined software version.

12. The apparatus of claim 8, wherein the instructions, when executed by the one or more processors, cause the apparatus to:
determine, based on one or more device properties of the computing device, a plurality of notifications;
determine, based on a user profile, one or more prioritized notifications of the plurality of notifications, wherein the user profile indicates sending the one or more prioritized notifications instead of at least another notification of the plurality of notifications; and
cause the sending by causing sending of the one or more prioritized notifications.

13. The apparatus of claim 8, wherein the instructions, when executed by the one or more processors, cause the apparatus to:
determine, based on content of the one or more notifications and a type of the computing device, a method of sending the one or more notifications.

14. The apparatus of claim 8, wherein the instructions, when executed by the one or more processors, cause the apparatus to:
determine, based on the year of manufacture of the computing device, that the computing device is subject to a recall, wherein the one or more notifications comprise an indication of the recall.

15. One or more non-transitory computer-readable media storing instructions that, when executed by one or more processors, cause:
receiving, from a network device, a list of one or more devices connected to the network device, wherein the list indicates a device identification of a computing device;
determining, based on the device identification of the computing device and based on information associating one or more device identifications with one or more device properties, a year of manufacture of the computing device;
determining, based on a determination that the year of manufacture of the computing device satisfies a threshold, one or more notifications; and
causing sending of the one or more notifications.

16. The one or more non-transitory computer-readable media of claim 15, wherein the instructions, when executed by the one or more processors, cause:
causing the one or more notifications to be inserted into a content stream to be sent to one or more devices.

17. The one or more non-transitory computer-readable media of claim 15, wherein the causing sending comprises:
causing sending, to a device associated with the computing device, of the one or more notifications.

18. The one or more non-transitory computer-readable media of claim 15, wherein the instructions, when executed by the one or more processors, cause:
determining the one or more notifications further based on a determination that a software version associated with the computing device matches a predetermined software version.

19. The one or more non-transitory computer-readable media of claim 15, wherein the instructions, when executed by the one or more processors, cause:
determining, based on one or more device properties of the computing device, a plurality of notifications;
determining, based on a user profile, one or more prioritized notifications of the plurality of notifications, wherein the user profile indicates sending the one or more prioritized notifications instead of at least another notification of the plurality of notifications; and
causing the sending by causing sending of the one or more prioritized notifications.

20. The one or more non-transitory computer-readable media of claim 15, wherein the instructions, when executed by the one or more processors, cause:
determining, based on content of the one or more notifications and a type of the computing device, a method of sending the one or more notifications.

\* \* \* \* \*